(12) United States Patent
Song et al.

(10) Patent No.: US 8,974,956 B2
(45) Date of Patent: Mar. 10, 2015

(54) SECONDARY BATTERY AND METHOD FOR MANUFACTURING ELECTRODE ASSEMBLY THEREOF

(75) Inventors: Chihoon Song, Yongin-si (KR); Andrey Matyushenko, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 202 days.

(21) Appl. No.: 12/972,015

(22) Filed: Dec. 17, 2010

(65) Prior Publication Data

US 2011/0151323 A1   Jun. 23, 2011

(30) Foreign Application Priority Data

Dec. 18, 2009   (KR) ........................ 10-2009-0126670

(51) Int. Cl.
*H01M 4/02* (2006.01)
*H01M 4/00* (2006.01)

(52) U.S. Cl.
USPC .......................................... 429/209; 429/128

(58) Field of Classification Search
CPC ...................................................... H01M 6/10
USPC ........................................ 429/128, 162, 209
See application file for complete search history.

(56) References Cited

U.S. PATENT DOCUMENTS

| | | | | |
|---|---|---|---|---|
| 3,090,895 | A * | 5/1963 | Hall ............................... | 361/303 |
| 6,664,005 | B2 * | 12/2003 | Kezuka et al. ................ | 429/233 |
| 6,740,446 | B2 * | 5/2004 | Corrigan et al. .............. | 429/152 |

FOREIGN PATENT DOCUMENTS

| | | |
|---|---|---|
| JP | 11-167930 | 6/1999 |
| KR | 1020000075254 | 12/2000 |
| KR | 1020050113860 | 12/2005 |
| KR | 1020050118845 | 12/2005 |

OTHER PUBLICATIONS

Notice of Allowance dated Oct. 17, 2011 for corresponding KR Application No. 10-2009-0126670.

* cited by examiner

*Primary Examiner* — Ula C. Ruddock
*Assistant Examiner* — Thomas H. Parsons
(74) *Attorney, Agent, or Firm* — Knobbe Martens Olson & Bear LLP (57) ABSTRACT

A secondary battery includes at least one positive electrode plate folded on the basis of a first fold line, and at least one negative electrode plate folded on the basis of a second fold line and stacked to face the at least one positive electrode plate with the second fold line coinciding with the first fold line.

6 Claims, 6 Drawing Sheets

SECONDARY BATTERY AND METHOD FOR MANUFACTURING ELECTRODE ASSEMBLY THEREOF

CROSS-REFERENCE TO RELATED APPLICATION

This application claims priority to and the benefit of Korean Patent Application No. 10-2009-0126670, filed on Dec. 18, 2009, in the Korean Intellectual Property Office, the disclosure of which is incorporated herein, by reference.

BACKGROUND OF THE INVENTION

1. Field of the Invention

Aspects of the present invention relate to a secondary battery and a method for manufacturing an electrode assembly for the same.

2. Description of the Related Art

In general, unlike primary batteries, which are not chargeable, secondary batteries are chargeable and dischargeable, and consequently, are widely used in a variety of electronic devices such as cellular phones, notebook computers, camcorders, and the like. In particular, lithium secondary batteries have a relatively high operating voltage and a high energy-density per unit weight, compared to nickel-cadmium batteries or nickel-metal hydride batteries. Accordingly, the lithium secondary batteries have recently been increasingly used in small, advanced electronics. A typical lithium secondary battery can be formed in a variety of shapes, for example, cylinders, squares, or pouch shapes.

A lithium secondary battery comprises an electrode assembly including a positive electrode plate, a separator, and a negative electrode plate, and an electrolyte interacting with the electrode assembly. Charging and discharging operations are performed due to the interaction between the electrode assembly and the electrolyte.

In manufacturing the electrode assembly, it is necessary to stack the positive electrode plate and the negative electrode plate. Here, in order to confirm whether the electrode plates are properly positioned or not, alignment of the electrode plates is necessarily checked using a position sensor, which can be a time-consuming, complicated process.

SUMMARY OF THE INVENTION

Aspects of the present invention provide a secondary battery having a positive electrode plate and a negative electrode plate stacked in an improved manner, and a method for manufacturing an electrode assembly thereof.

Aspects of the present invention further provide a secondary battery in which a positive electrode plate and a negative electrode plate can be better aligned by conformational matching of components associated with folding the positive and negative electrode plates, and a method for manufacturing an electrode assembly thereof.

According to aspects of the present invention, there is provided a secondary battery including at least one positive electrode plate folded on the basis of a first fold line, and at least one negative electrode plate folded on the basis of a second fold line and stacked to face the at least one positive electrode plate with the second fold line coinciding with the first fold line.

Each of the positive electrode plate and the negative electrode plate may include an electrode collector formed of a metal plate, and an electrode coating portion formed on a surface of the electrode collector.

In addition, the electrode collector may have a non-coating portion on which the electrode coating portion is not formed, and at least one of the first and second fold lines may be disposed on the non-coating portion.

The first and second fold lines may be provided to divide the electrode collector into two parts or may be disposed to lean to one side of the electrode collector.

In addition, the first and second fold lines may be disposed in parallel with the lateral surfaces of the respective electrode collector or may be disposed along the diagonal lines of the respective electrode collectors.

The secondary battery may further include an insulating separator coated on the electrode collector.

According to aspects of the present invention, there is provided a method for manufacturing a secondary battery, the method including (a) preparing at least one positive electrode plate folded on the basis of a first fold line, (b) preparing at least one negative electrode plate folded on the basis of a second fold line, and (c) stacking the at least one negative electrode plate on the at least one positive electrode plate to face the at least one positive electrode plate with the second fold line coinciding with the first fold line.

In the steps of preparing the at least one positive electrode plate and the at least one negative electrode plate, the first and second fold lines may be disposed at the non-coating portions of the positive electrode plate and the negative electrode plate, respectively.

In addition, in the steps of preparing the at least one positive electrode plate and the at least one negative electrode plate, an insulating separator may be coated on at least one of opposing surfaces of the positive electrode plate and the negative electrode plate.

Further, the separator may be made of ceramic or polypropylene.

In addition, the method for manufacturing the secondary battery may further include (d) unfolding the positive electrode plate and the negative electrode plate such that the respective parts divided by the first or second fold line enter into a state in which they are almost coplanar with each other, compared to a state in which they are folded.

The secondary battery according to the present invention allows first and second electrode plates to be stacked in a simple, accurate manner just by conformational matching of a first fold line formed at the positive electrode plate and a second fold line formed at the negative electrode plate, without the need for separately checking whether the positive and negative electrode plates are accurately aligned or not. Accordingly, the manufacturing equipment required for manufacturing the electrode assembly is simplified. In addition, a time required to check whether the positive and negative electrode plates are accurately aligned or not is shortened.

Additional aspects and/or advantages of the invention will be set forth in part in the description which follows and in part will be obvious from the description or may be learned by practice of the invention.

BRIEF DESCRIPTION OF THE DRAWINGS

The aspects, features and advantages of the present invention will be more apparent from the following detailed description in conjunction with the accompanying drawings, in which.

DETAILED DESCRIPTION OF THE INVENTION

A secondary battery according to an exemplary embodiment of the present invention will now be described in detail with reference to the accompanying drawings.

Figure 1:
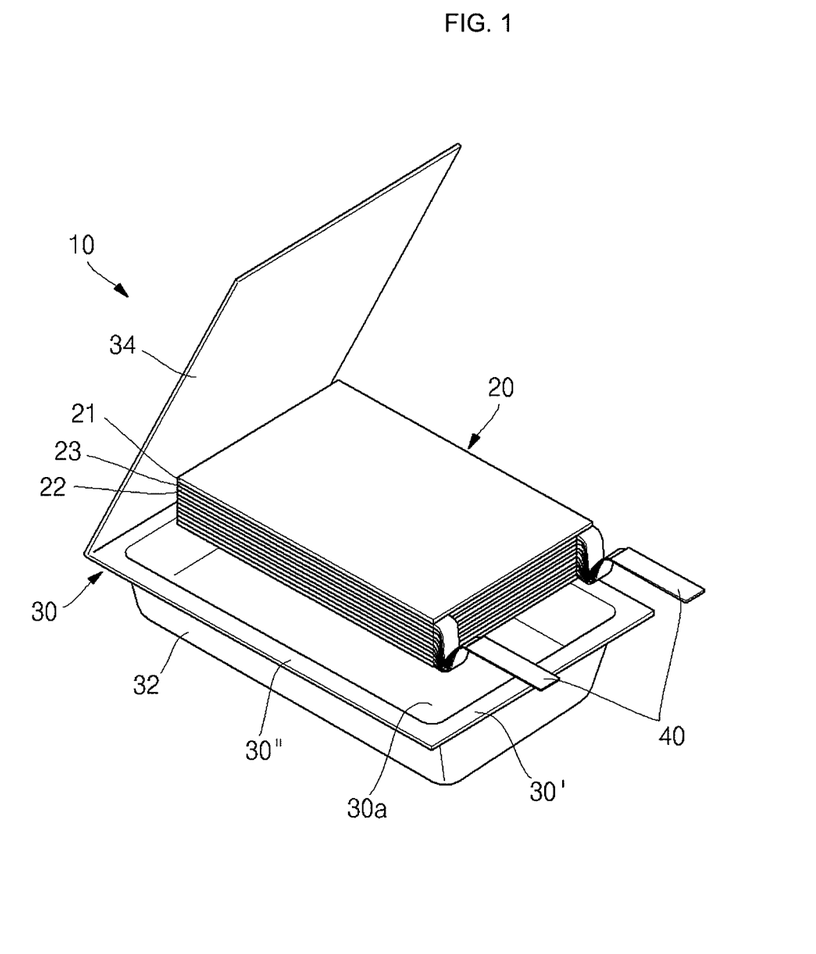
FIG. 1 is an exploded perspective view illustrating a secondary battery according to an exemplary embodiment.

FIG. 1 is an exploded perspective view illustrating a secondary battery according to an exemplary embodiment.

Referring to FIG. 1, the secondary battery 10 includes an electrode assembly 20 and a pouch case 30.

The electrode assembly 20 is formed by alternately stacking at least one positive electrode plate 21 and at least one negative electrode plate 22 each having an electrode coating portion formed on a surface of each electrode collector, and a separator 23 interposed between the positive electrode plate 21 and the negative electrode plate 22.

The positive electrode plate 21 is formed by coating a positive electrode active material containing a lithium-based oxide as a main component on both surfaces of a positive electrode collector formed of a thin plate made of aluminum foil. The negative electrode plate 22 is formed by coating a negative electrode active material containing a carbon material as a main component on both surfaces of a negative electrode collector formed of a thin metal plate made of copper foil.

The pouch case 30 is divided into a lower case 32 and an upper case 34 on the basis of a folded portion. The lower case 32 has a receiving part 30a for accommodating the electrode assembly 20 and a predetermined amount of an electrolyte. The upper case 34 is formed in one embodiment as a cover to cover an exposed upper portion of the electrode assembly 20. Extending portions to be sealed, each having a predetermined width, are formed at opposing edge regions of the lower case 32 and the upper case 34, respectively.

The aforementioned secondary battery is assembled in the following manner.

First, in a state in which the positive and negative electrode terminals 40 are ultrasonic welded or spot welded to the corresponding electrode tabs of the electrode assembly 20, the electrode assembly 20 is placed in the receiving part 30a of the lower case 32, followed by injecting a predetermined amount of electrolyte into the receiving part 30a. Then, the electrode assembly 20 is covered by the upper case 34 in such a manner that the positive and negative electrode terminals 40 protrude outward of the pouch case 30. The extending portions of the lower case 32 and the upper case 34 are brought into contact with each other to then be compressively heated using a predetermined thermal fuser (not shown), thereby forming seal portions at a top end 30' and opposing sides 30" of the pouch case 30, respectively.

Next, the seal portions formed at the opposing sides 30" of the pouch case 30 are folded toward adjacent lateral surfaces of the pouch case 30. In addition, a protective circuit module (not shown) is disposed on the seal portions formed at the top end 30' of the pouch case 30 in a lengthwise direction of the pouch case 30. Then, the electrode terminals 40 and corresponding portions of the protective circuit module are connected to each other, thereby completing the assembling of the secondary battery 10. The protective circuit module includes various circuits for preventing any danger caused by malfunction of the secondary battery 10 due to overcharge or over-discharge of the secondary battery 10 during charging/discharging of the secondary battery 10.

In the manufacture of the secondary battery 10, stacking of the electrode assembly 20 is performed in the following manner.

Figure 2:
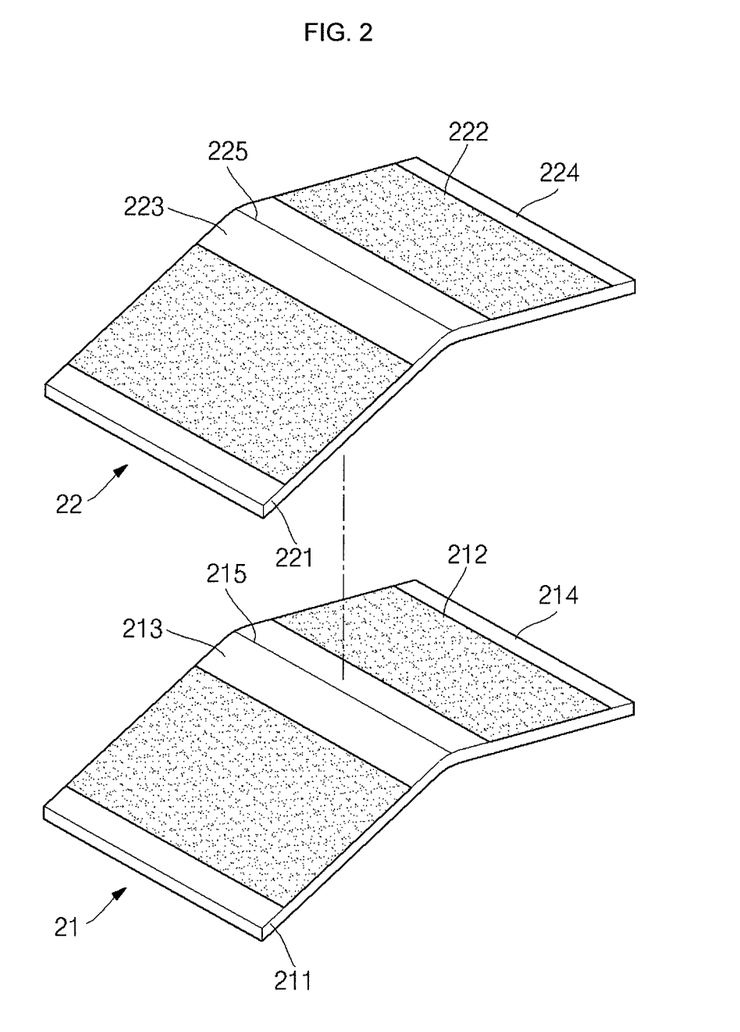
FIG. 2 is an exploded perspective view illustrating positive and negative electrode plates of the secondary battery illustrated in FIG. 1.

FIG. 2 is an exploded perspective view illustrating positive and negative electrode plates 21 and 22 constituting the electrode assembly 20 of the secondary battery 10 illustrated in FIG. 1.

Referring to FIG. 2, the positive electrode plate 21 includes a positive electrode coating portion 212 formed on both surfaces of the positive electrode collector 211 formed of a metal plate. The positive electrode coating portion 212 is not formed at a central non-coating portion 213 and a peripheral non-coating portion 214. The central non-coating portion 213 may be formed for the purpose of preventing resistance from increasing due to peeling off a positive electrode active material coated on the positive electrode collector 211 when the positive electrode collector 211 is folded on the basis of the first fold line 215. The peripheral non-coating portion 214 may be formed for the purpose of connecting a terminal connected to the electrode terminal 40 (see FIG. 1) to the positive electrode collector 211.

Like the positive electrode plate 21, the negative electrode plate 22 may include a negative electrode collector 221, a negative electrode coating portion 222, a central non-coating portion 223, a peripheral non-coating portion 224, and a second fold line 225.

Figure 4:
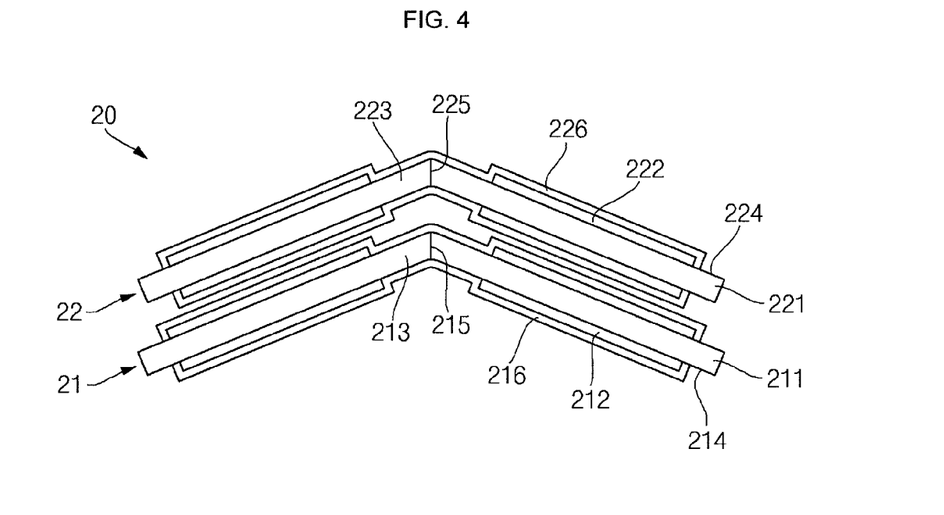
FIG. 4 is a side view of an electrode assembly formed by stacking a plurality of positive and negative electrodes illustrated in FIG. 2.

In order to achieve proper stacking of the positive electrode plate 21 and the negative electrode plate 22, the positive electrode plate 21 and the negative electrode plate 22 are stacked in a state in which the second fold line 225 of the negative electrode plate 22 coincides with the first fold line 215 of the positive electrode plate 21. Accordingly, accurate alignment of the positive electrode plate 21 and the negative electrode plate 22 are simply achieved by conformational matching of the respective fold lines 215 and 225. The separator (23 of FIG. 1) may be separators 216 and 226 integrally formed on the outer surfaces of the positive electrode plate 21 and the negative electrode plate 22, as shown in FIG. 4. The separators 216 and 226 may be made of ceramic or polypropylene.

Figure 3:
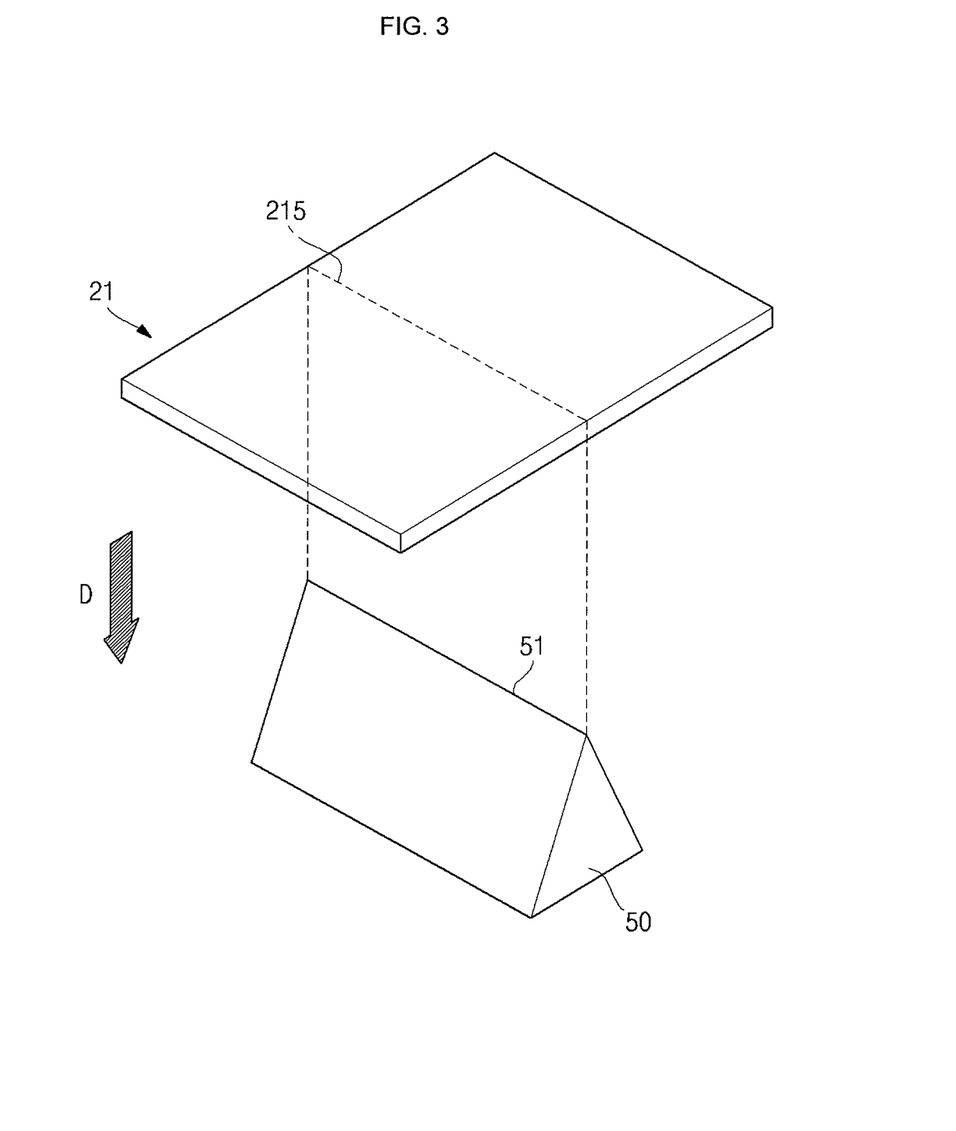
FIG. 3 is a diagram for illustrating the concept of a process for forming fold lines illustrated in FIG. 2.

FIG. 3 is a diagram for illustrating the concept of a process for forming fold lines 215 and 225 illustrated in FIG. 2.

Referring to FIG. 3, in a state in which the positive electrode coated portion 212 (or the negative electrode coated portion 222) is formed on the positive electrode plate 21 (or the negative electrode plate 22) and the separators 216 and 226 (see FIG. 4) are further formed thereon, the positive electrode plate 21 is moved in a direction indicated by reference character 'D' toward a folding mandrel 50.

The folding mandrel 50 has its edge part 51 facing the positive electrode plate 21 and coinciding with the first fold line 215.

If the positive electrode plate 21 is further moved in the direction 'D' in a state in which it contacts the edge part 51 of the folding mandrel 50, the positive electrode plate 21 is folded on the basis of the first fold line 215. Accordingly, the positive electrode plate 21 is defined into two parts by the first fold line 215, the two parts are formed of two planes crossing each other at the first fold line 215.

FIG. 4 is a side view of an electrode assembly 20 formed by stacking a plurality of the positive and negative electrode plates 21 and 22 illustrated in FIG. 2.

Referring to FIG. 4, the positive electrode coated portions 212 are formed on portions other than non-coating portions 213 and 214 of both surfaces of the positive electrode collector 211 of positive electrode plates 21. The positive electrode plate 21 is folded on the basis of the first fold line 215 positioned on the non-coating portion 213.

In addition, the negative electrode plates 22 are disposed in substantially the same manner as the positive electrode plates 21. One negative electrode plate 22 is stacked on one positive electrode plate 21, and another positive electrode plate 21 is stacked on the negative electrode plate 22. Accordingly, the positive electrode plates 21 and the negative electrode plates 22 are alternately stacked on one another. The separators 216 and 226 are disposed between the positive electrode plate 21 and the negative electrode plate 22.

In the course of stacking, the positive electrode plate 21 and the negative electrode plate 22 are aligned in a simplified manner by allowing the first fold line 215 and the second fold line 225 to coincide with each other.

Figure 5:
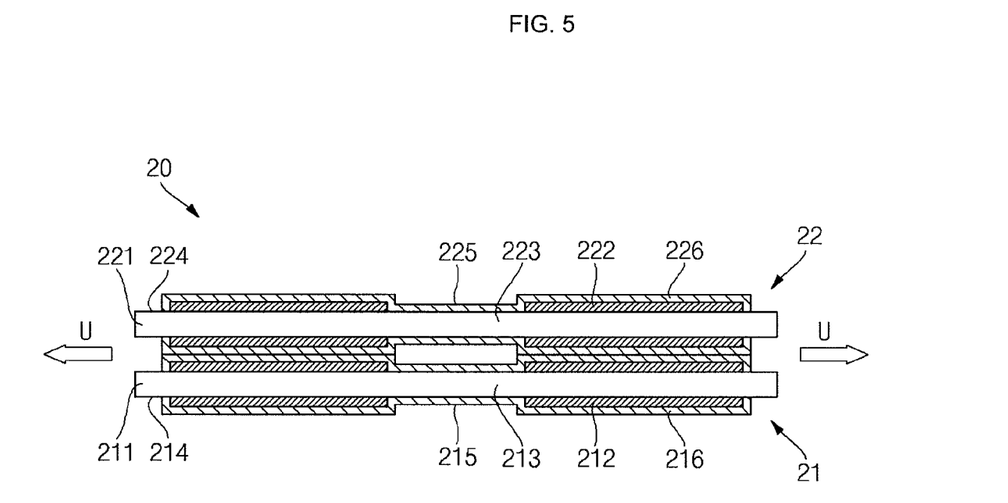
FIG. 5 is a side view illustrating a state in which the electrode assembly illustrated in FIG. 4 is unfolded.

FIG. 5 is a side view illustrating a state in which the electrode assembly 20 illustrated in FIG. 4 is unfolded.

Referring to FIG. 5, the positive electrode plate 21 and the negative electrode plate 22 stacked in a state in which they are folded for alignment as shown in FIG. 4 are pulled away in a direction indicated by reference character 'U' to then be unfolded.

Accordingly, the respective divided parts of the positive electrode plate 21 and the negative electrode plate 22 are positioned to be coplanar with each other or enter into a state in which they are almost coplanar with each other, compared to the state shown in FIG. 4.

Figure 6:
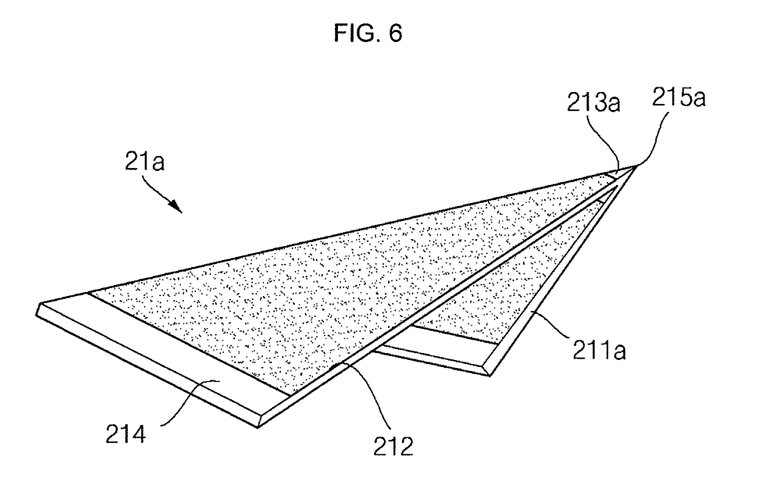
FIG. 6 is a perspective view illustrating a modified example positive electrode plate of the positive electrode plate illustrated in FIG. 2.

FIG. 6 is a perspective view illustrating a positive electrode plate according to another embodiment of the present invention.

Although only the modified example of the positive electrode plate 21, that is, the positive electrode plate 21a, is illustrated in FIG. 6, it will be readily appreciated by one skilled in that art that the same is applicable to the negative electrode plate 22. In another embodiment of the present invention, same reference numerals will be assigned to similar or same components as the above-mentioned embodiment of the present invention, and the detailed explanation thereof is omitted.

Referring to FIG. 6, the positive electrode plate 21a has a central non-coating portion 213a formed along the diagonal line of a positive electrode collector 211a.

When the positive electrode plate 21a is folded on the basis of the first fold line 215a formed along the diagonal line of the positive electrode collector 211a, two parts of the positive electrode collector 211a divided by the first fold line 215a still have the same area with each other.

As described above, since the positive electrode plate 21a is divided into two parts by the first fold line 215a, when a plurality of positive electrode plates 21a are stacked, stacking of the plurality of the positive electrode plates 21a can be achieved in a stable manner. In addition, since the two parts are well balanced, one of the two parts of the positive electrode plates 21a is not deformed compared with other of the two parts in a severely biased manner.

Figure 7:
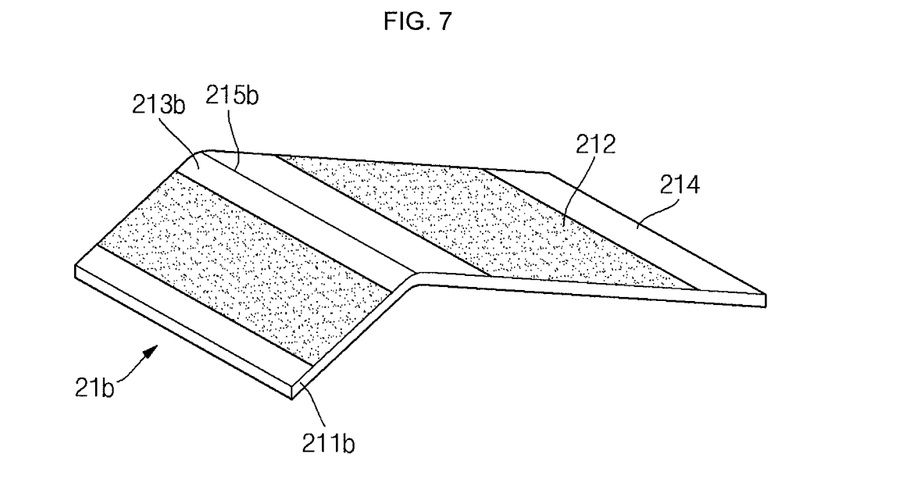
FIG. 7 is a perspective view illustrating another modified example positive electrode plate of the positive electrode plate illustrated in FIG. 2.

FIG. 7 is a perspective view illustrating a positive electrode plate according to still another embodiment of the present invention.

Although only the modified example of the positive electrode plate 21, that is, the positive electrode plate 21b, is illustrated in FIG. 7, it will be readily appreciated by one skilled in that art that the same is applicable to the negative electrode plate 22. In another embodiment of the present invention, same reference numerals will be assigned to similar or same components as the above-mentioned embodiment of the present invention, and the detailed explanation thereof is omitted.

Referring to FIG. 7, the central non-coating portion 213b of the positive electrode plate 21b is disposed to lean to one side of the positive electrode collector 211b. Accordingly, two parts of a positive electrode collector 211b divided by a first fold line 215b have different areas from each other.

Even so, in a case where a second fold line of the negative electrode plate is formed to coincide with the first fold line 215b of the positive electrode plate 21b, the positive electrode plate 21b and the negative electrode plate can also be simply stacked just by coinciding the first fold line 215b with the second fold line of the negative electrode plate.

Figure 8:
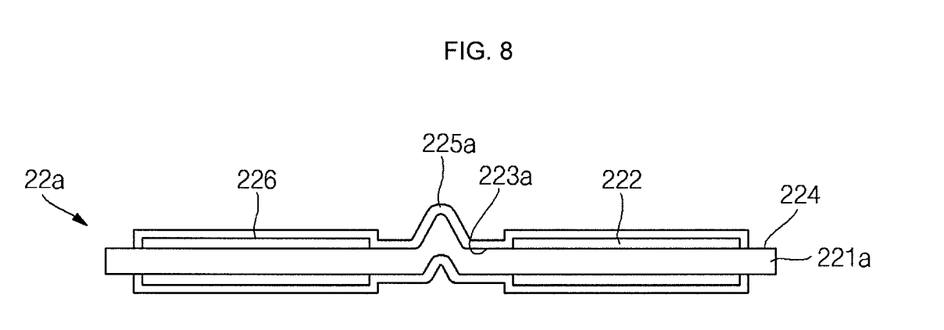
FIG. 8 is a side view illustrating a still modified example positive electrode plate of the negative electrode plate illustrated in FIG. 2.

FIG. 8 is a side view illustrating a negative electrode plate according to another embodiment of the present invention.

Although only the modified example of the negative electrode plate 22a is illustrated in FIG. 8, it will be readily appreciated by one skilled in that art that the same is applicable to the positive electrode plate 21. In another embodiment of the present invention, same reference numerals will be assigned to similar or same components as the above-mentioned embodiment of the present invention, and the detailed explanation thereof is omitted.

Referring to FIG. 8, the negative electrode plate 22a has a central non-coating portion 223a having two parts of the negative electrode collector 221a divided in such a state as shown in FIG. 2 further folded, respectively. In other words, the two parts of the negative electrode collector 221a are folded in a first direction on the basis of a second fold line 225a and the parts divided by the second fold line 225a are then further folded in a second direction opposite to the first direction.

With this configuration, a position of the second fold line 225a can be more markedly identified. After the stacking is completed, the negative electrode plate 22a can also be unfolded by a tension applied in the direction 'U' shown in FIG. 5.

Although arrangements and actuation mechanisms in the secondary battery and the method for manufacturing the electrode assembly thereof according to the present invention have been illustrated through particular embodiments, it should be understood that many variations and modifications may be made in those embodiments within the scope of the present invention by selectively combining all or some of the illustrated embodiments herein described.

What is claimed is:

1. A secondary battery, comprising:
   at least one positive electrode plate folded on a basis of a first fold line into two parts; and
   at least one negative electrode plate folded on the basis of a second fold line into two parts and stacked to face the at least one positive electrode plate with the second fold line coinciding with the first fold line,
   wherein each of the at least one positive electrode plate and the at least one negative electrode plate comprises an electrode collector formed of a metal plate, and an electrode coating portion formed on a surface of the electrode collector, wherein the first and second fold lines are positioned to align the at least one positive and the at least one negative electrode plate when stacked wherein the at least one positive electrode plate and the at least one negative electrode plate are further folded in a direction opposite the first and second fold lines so that the electrode coating portions of the at least one positive electrode plate and at least one negative electrode plate on opposite sides of the first and second fold lines are respectively co-planar.

2. The secondary battery of claim 1, wherein the at least one positive electrode collector and the at least one negative electrode collector has a non-coating portion on which the electrode coating portion is not formed, and the first and second fold lines are disposed on the non-coating portion.

3. The secondary battery of claim 2, further comprising an insulating separator coated on the at least one positive electrode collector and the at least one negative electrode collector.

4. The secondary battery of claim 1, wherein the first and second fold lines are disposed to divide the at least one positive electrode collector and the at least one negative electrode collector into two parts.

5. The secondary battery of claim 4, wherein the first and second fold lines are disposed in parallel with the lateral surfaces of the at least one positive electrode collector and the at least one negative electrode collector respective electrode collectors.

6. The secondary battery of claim 4, wherein the first and second fold lines are disposed along diagonal lines of the respective electrode collectors.

* * * * *